United States Patent
Shimizu et al.

(10) Patent No.: US 6,990,782 B2
(45) Date of Patent: Jan. 31, 2006

(54) METHOD FOR ASSEMBLING BUILDING WITH THIN AND LIGHTWEIGHT SHAPED-STEEL MEMBERS

(75) Inventors: Jun Shimizu, Tokyo (JP); Yoshimichi Kawai, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/151,657

(22) Filed: May 20, 2002

(65) Prior Publication Data

US 2002/0194811 A1 Dec. 26, 2002

(30) Foreign Application Priority Data

Jun. 20, 2001 (JP) .................................. 2001-186846

(51) Int. Cl.
*E04C 3/02* (2006.01)

(52) U.S. Cl. .................... 52/633; 52/456; 52/731.1; 403/287; 403/257; 403/260; 403/382

(58) Field of Classification Search ............. 52/633, 52/731.1; 403/230, 231, 286, 257, 258, 260, 403/382, 403, 315, 316, 317, 322.2, 282
See application file for complete search history.

(56) References Cited

U.S. PATENT DOCUMENTS

| | | | | |
|---|---|---|---|---|
| 2,632,533 A | * | 3/1953 | MacKenzie | 52/633 |
| 2,990,920 A | * | 7/1961 | Hoffman, Jr. | 52/633 |
| 3,094,197 A | * | 6/1963 | Attwood | 52/100 |
| 3,845,601 A | * | 11/1974 | Kostecky | 52/290 |
| 3,999,350 A | * | 12/1976 | MacKenzie | 52/633 |
| 4,315,386 A | * | 2/1982 | Clarke | 52/93.1 |
| 4,625,488 A | * | 12/1986 | Kern | 52/665 |
| 4,869,040 A | * | 9/1989 | Howell | 52/633 |
| 4,918,899 A | * | 4/1990 | Karytinos | 52/690 |
| 5,127,760 A | * | 7/1992 | Brady | 403/230 |
| 5,394,665 A | * | 3/1995 | Johnson | 52/241 |
| 5,419,089 A | | 5/1995 | Hill | |
| 5,901,523 A | | 5/1999 | Tasi | |

FOREIGN PATENT DOCUMENTS

| AU | 60631/94 | 11/1994 |
|---|---|---|
| CN | 2158897 | 3/1994 |
| CN | 2266008 | 10/1997 |
| WO | WO 96/22428 | 7/1996 |

* cited by examiner

*Primary Examiner*—Carl D. Friedman
*Assistant Examiner*—Nahid Amiri
(74) *Attorney, Agent, or Firm*—Kenyon & Kenyon

(57) ABSTRACT

The present invention provides a method for assembling structural members of thin and lightweight shaped steel, the thin and lightweight shaped-steel members to be assembled having at least one joint hole or concave/convex portion at an appropriate position of a flange or web of the thin and lightweight shaped steel member, and temporarily joining portions of the thin and lightweight shaped steel members to each other for easy assembly.

1 Claim, 4 Drawing Sheets

(a)

(b)

(a)

(b)

(a)

(b)

METHOD FOR ASSEMBLING BUILDING WITH THIN AND LIGHTWEIGHT SHAPED-STEEL MEMBERS

BACKGROUND OF THE INVENTION

1. Field of the Invention

The present invention relates to a method for assembling a building from structural members of thin and lightweight shaped steel. In this regard, the thin and lightweight shaped-steel member referred to in the present invention is a building member obtained by processing a steel sheet of 2.3 mm thickness, or less, to have a desired shape, and the building to which the present invention is applied is a low building, particularly one having three stories or fewer.

2. Description of the Related Art

A steel house is one example of such a low building having three stories or fewer using thin and lightweight shaped-steel members. In the steel house, the thin and lightweight shaped-steel members are used as structural frame members or truss members for a wall or a roof. Since the thickness of the member is as thin as 2.3 mm or less, typically 1.0 mm, a bolt joint or others used in a heavy-weight structure cannot be employed because there is a risk in that a local deformation or strain may occur in the member. Instead, as shown in FIG. 1(a), webs 1a, 1b of the members (of thin and lightweight shaped steel) to be joined together are disposed opposite to each other and just located at the joint position. The joint points are then marked, and the members to be joined are temporarily fixed to each other by a clamp or the like. A plurality of drill screws 3 are directly applied to the marked points to fully join the members. A similar method is adopted when the members 1a and 1b to be joined are joined via a gusset plate 2 as shown in FIG. 1(b). In these methods, however, pilot holes necessary for the joint are seldom provided in advance at the joint position on the member to be joined.

In the prior art for joining the thin and lightweight shaped-steel members in a low building, as the joining operation is carried out in situ on the members having no pilot holes in accordance with the above-mentioned procedure, the operation requires a long operation time and results in the very inferior joining accuracy.

An object of the present invention is to solve the above problems and to provide a simple method for assembling a building of thin and lightweight shaped steel members in which at least one pilot hole is provided at a joint position in any portion, particularly a flange or web portion, of a thin and lightweight shaped steel member to be joined to another, and a drill screw for joining the members is set at a proper position, or concave/convex portions are provided in channel steel members, respectively, to temporarily fix the same together.

SUMMARY OF THE INVENTION

To solve the above-mentioned problems, the present invention provides 1) a method for assembling a low building from thin and lightweight shaped-steel members, characterized in that at least one joint hole is provided at a position necessary for the joint in a flange, a web or a gusset of at least one of the shaped steel members to be joined together, and 2) a method for assembling a low building from thin and lightweight shaped steel members, characterized in that concave/convex portions are provided at positions necessary for the joint in a flange, web or gusset of the shaped-steel members to be joined together. Further, the present invention provides a method for assembling a building from thin and lightweight shaped-steel members, wherein a joint drill screw is held so that a conical surface at a tip end of the joint drill screw or a screw-side wall of the joint drill screw are brought into contact with the joint hole provided in at least one of the flange, web and gusset to be joined together, and then is driven into the joint hole.

DESCRIPTION OF THE PREFERRED EMBODIMENTS

The preferred embodiments of the present invention will be described in detail below with reference to the attached drawings.

Figure 1:
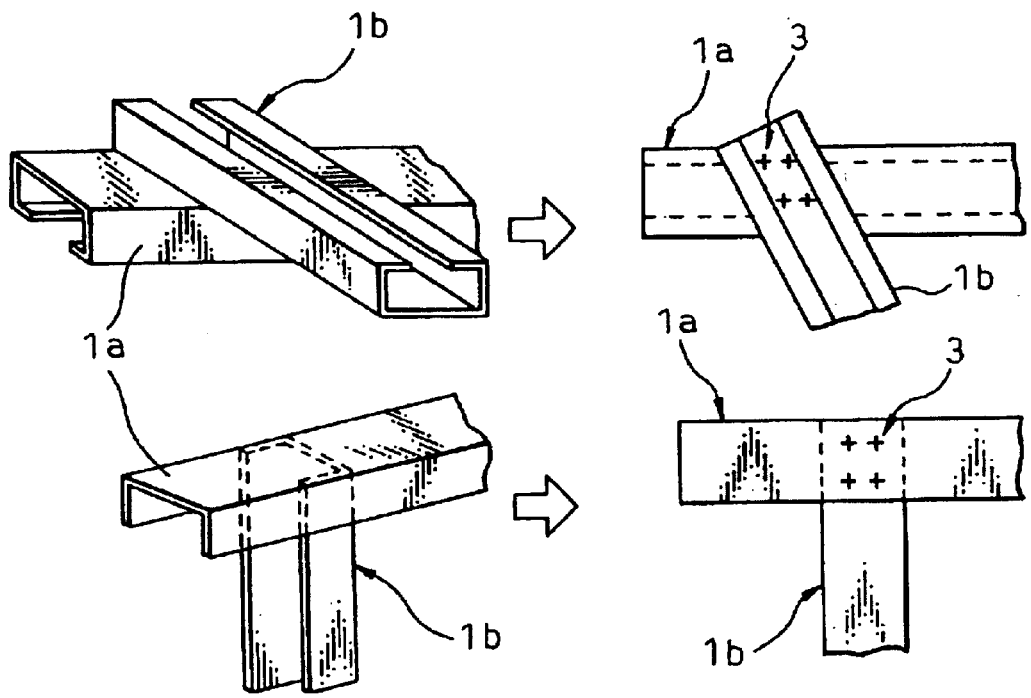
FIGS. 1(a) and 1(b) illustrate examples of the joint of thin and lightweight shaped-steel members in the prior art.
Figure 1:
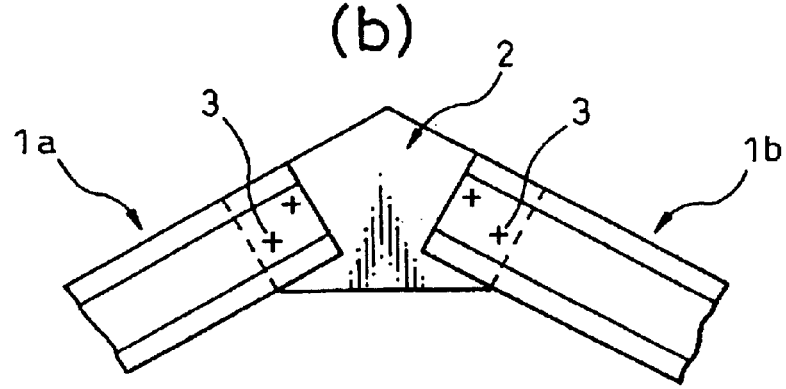
Figure 2:
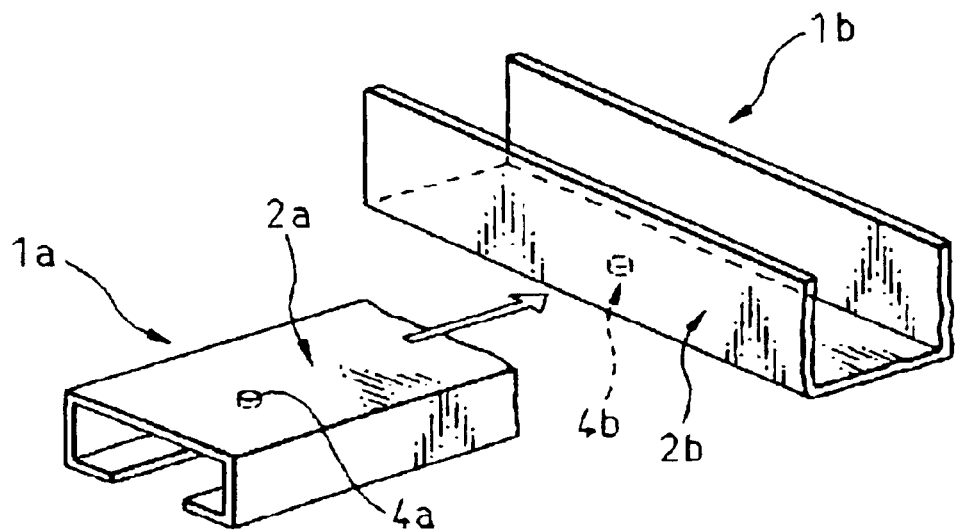
FIGS. 2(a) and 2(b) illustrate examples of the joint of thin and lightweight shaped-steel members in the present invention.
Figure 2:
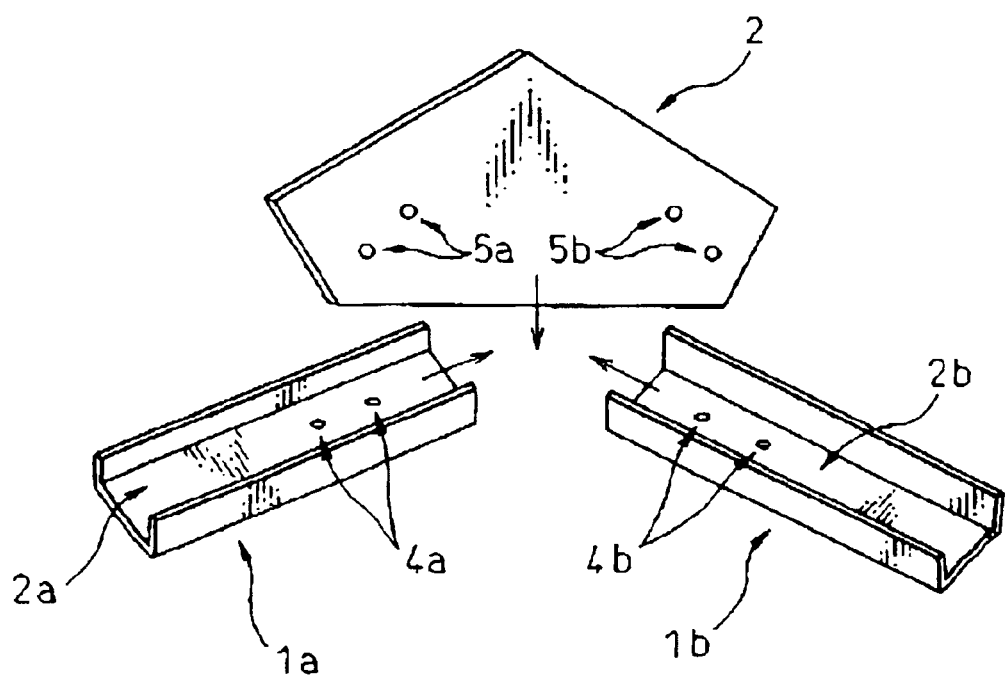

In a method for joining thin and lightweight shaped-steel members together directly or via a joining plate such as a gusset, a joint position is accurately indexed in advance in a factory on the respective member of a shape as shown in FIGS. 2(a) and 2(b), and at least one joint pilot hole 4a, 4b is bored in an optional portion of a web of the thin and lightweight shaped-steel member, or at least one joint pilot hole 5a, 5b is bored at a position corresponding to the joint pilot hole 4a, 4b on a gusset 2. The respective members are assembled to have a required shape in situ by fastener 6 such as a drill screw, rivet or bolt. By adopting such a joint system, the thin and lightweight shaped-steel members are joined at a correct joint position while eliminating the marking in situ of the joint points of the member located at the joint position, which is necessary in the prior art.

Figure 3:
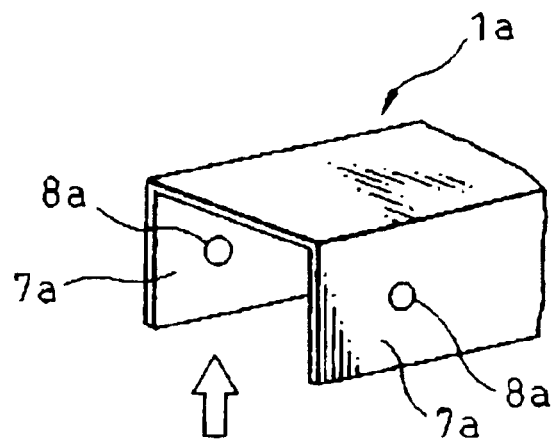
FIGS. 3(a) and 3(b) illustrate examples of the temporary fixation of thin and lightweight shaped-steel members in the present invention.
Figure 3:
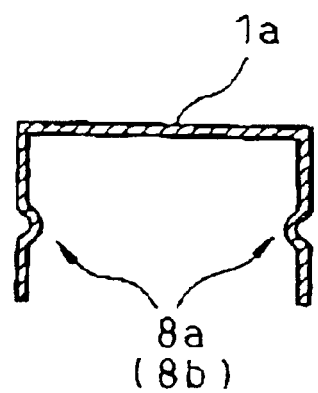
Figure 3:
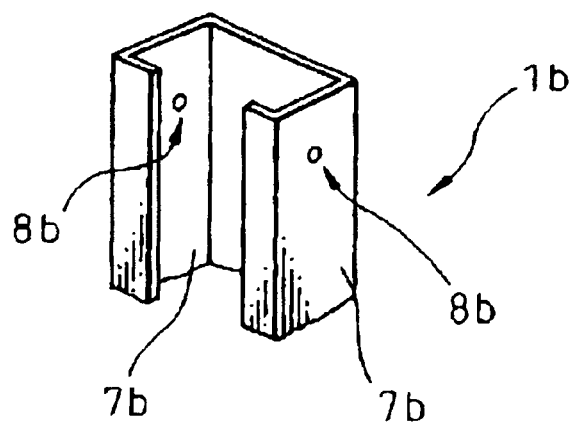

Alternatively, when the thin and lightweight shaped-steel members are temporarily fixed directly or via a gusset to each other, as shown in FIG. 3, flanges 7a, 7b of the thin and lightweight shaped-steel members 1a, 1b are provided with a pair of convex/concave portions 8a, 8b, respectively, and the flanges 7b of the thin and lightweight shaped-steel member 1b are fitted into a gap between the flanges 7a of the thin and lightweight shaped steel member 1a and temporarily fixed via the convex/concave portions Sa and 8b. In more detail, when the thin and lightweight shaped-steel member 1a is temporarily fixed to the thin and lightweight shaped steel member 1b to be joined together, the flange 7a of the thin and lightweight shaped-steel member 1a is provided with the concave/convex portion 8a which is recessed outward and protruded inward, and the flange 7b of the thin and lightweight shaped-steel member 1b is similarly provided with the concave/convex portion 8*b* which is recessed outward and protruded inward. The thin and lightweight shaped-steel member 1*a* is inserted into a gap between the flanges 8*b* of the thin and lightweight shaped steel member 1*b* so that the concave/convex portion 8*a* provided in the flange 7*a* of the channel steel member 1*a* is fitted into the concave/convex portion 8*b* provided in the flange 7*b* of the channel steel member 1*b*. Thus, the recess and the protrusion are engaged with each other to temporarily fix both the channel steel members. It is also possible to complete the building structure by attaching a surface member to an outer surface of the temporarily fixed thin and lightweight shaped steel members 1*a* and 1*b* and fastening the both by means of a fastener such as a drill screw. By adopting such a structure as described above, the temporary fixation by means of screws used in the prior art can be eliminated.

Figure 4:
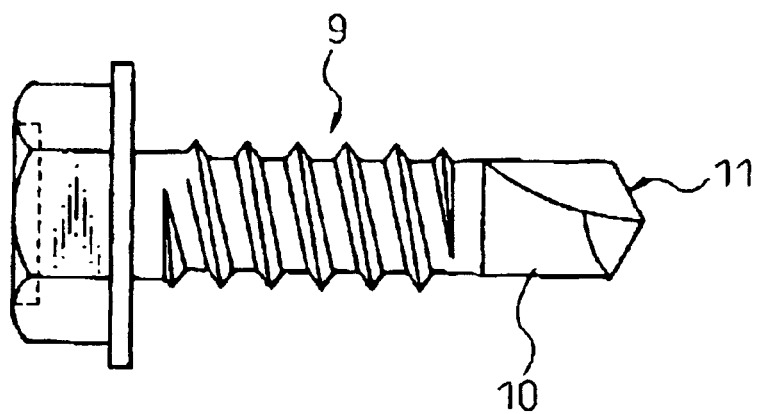
FIG. 4 illustrates a shape of a joint drill screw used for joining thin and lightweight shaped-steel members in the present invention.
Figure 5:
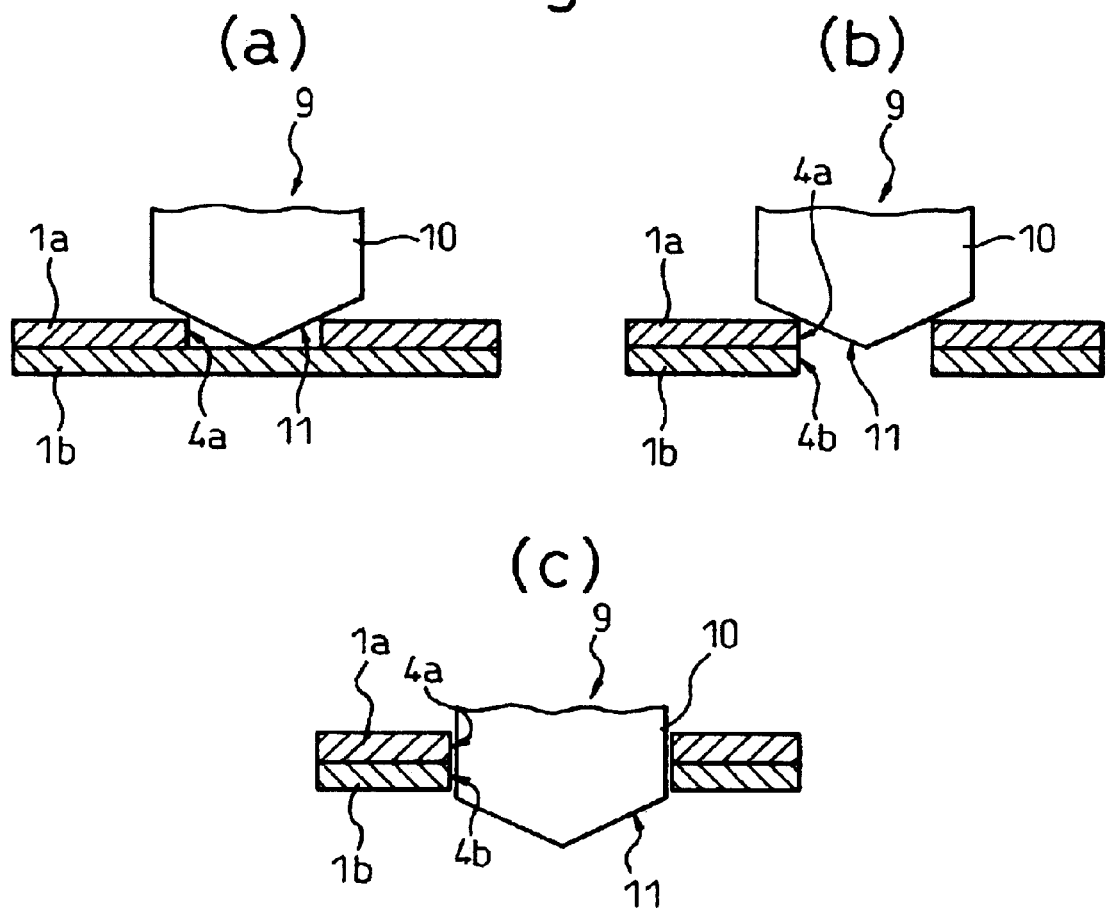
FIGS. 5(a), 5(b) and 5(c) illustrate various methods for joining thin and lightweight shaped-steel members with a joint drill screw.
Figure 6:
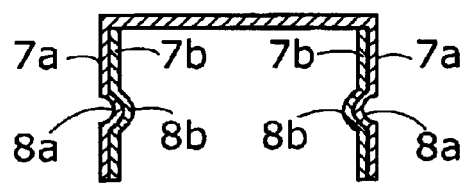
FIG. 6 illustrates a cross-sectional view of a convex portion of one flange mating with and nested in the concave portion of another flange, in accordance with the present invention.

Next, one embodiment of the present invention, in which a drill screw is used for carrying out the above-mentioned joining method, will be described. FIG. 4 illustrates a shape of a drill screw to be inserted into the joint hole provided in the flange, web or gusset of the shaped steel member to fix the shaped-steel member to the other in the joining method of the present invention described above. This drill screw 9 is of a conventional type widely used for this purpose, having a parallel part 10 at a tip end of the screw and a conical cutting edge 11 on the extension thereof. FIGS. 5(*a*) to 5(*c*) are preferable examples for actually joining the flanges or webs of the shaped channel members or the gusset by using the drill screw 9. In FIG. 5(*a*), when the thin and lightweight shaped-steel members 1*a* and 1*b* are joined together, a joint pilot hole is provided in advance solely in the thin and lightweight shaped-steel member 1*a* and then the drill screw is driven into the joint pilot hole. In FIGS. 5(*b*) and 5(*c*), when the thin and lightweight shaped-steel members 1*a* and 1*b* are joined together, joint pilot holes are provided in advance in both of the shaped-steel members 1*a* and 1*b* and then the drill screw is driven into the joint holes.

In the embodiment shown in FIG. 5(*a*), the conical cutting edge 11 of the drill screw 9 is maintained in a (completely or partially) contacting state with the circular periphery of the joint pilot hole 4*a* provided in one 1*a* of the shaped-steel members to be joined together, and is then driven to complete the joint. In the embodiments shown in FIGS. 5(*b*) and 5(*c*), the conical cutting edge 11 of the drill screw 9 is maintained in a contacting state with the circular periphery of the joint pilot hole 4*a* provided in one of the shaped-steel members to be joined together or the parallel part 10 of the screw tip end is maintained in a contacting state with the circular periphery of both the joint pilot holes 4*a*, 4*b*, and is then driven to complete the joint.

By adopting such an assembling method as described above, it is possible to assuredly avoid the discrepancy between the joint holes, or slip page of the members to be joined, during the joining operation, while eliminating means such as a clamp, for preventing the members to be joined together from shifting from the correct position which may often occur in the prior art.

As described hereinbefore, according to the present invention, a method capable of simply and easily assembling a low building with high precision from thin and lightweight shaped steel members is provided, without using a marking indicating the joint position of the members to be joined or a clamp for temporarily fixing the members.

What is claimed is:

1. A method for assembling a low building from thin and lightweight shaped-steel members, said method comprising:

providing two thin and lightweight shaped-steel members to be joined together by a joint between a flange, a web or a gusset at a preselected joint location;

providing at least one joint hole at the joint location in at least one of the flange, the web or the gusset to be joined together;

providing concave/convex portions respectively at the joint location in each of the flange, the web or the gusset to be joined together;

holding a joint drill screw so that a conical surface of a tip end of the joint drill screw or a screw side wall of the joint drill screw is brought into contact with the at least one joint hole provided at the joint location in at least one of the flange, the web or the gusset to be joined together; and then driving the joint drill screw into the at least one joint hole.

\* \* \* \* \*